(No Model.)
J. P. KELLY.
PNEUMATIC VEHICLE WHEEL.
No. 504,273. Patented Aug. 29, 1893.
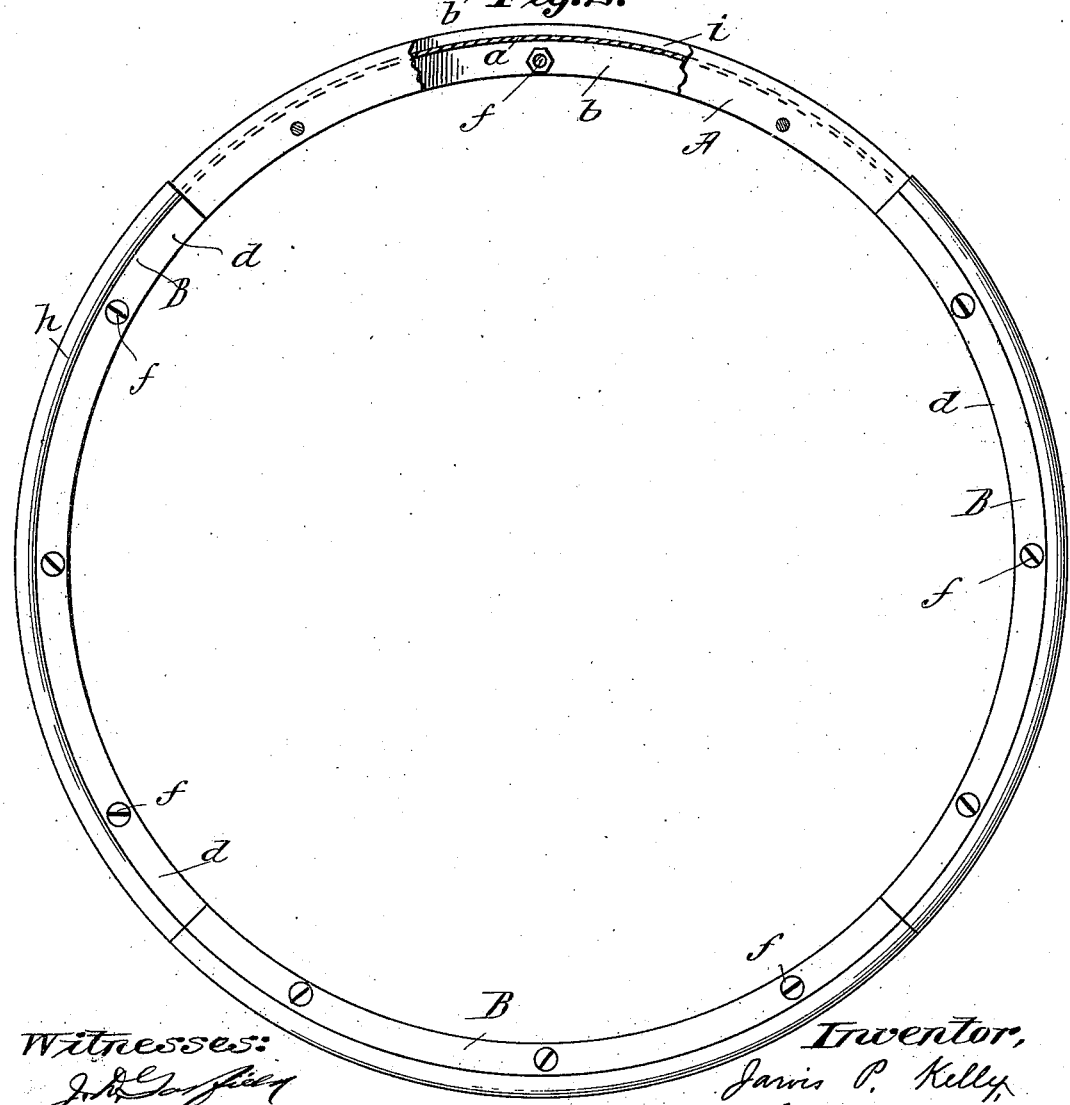

UNITED STATES PATENT OFFICE.

JARVIS P. KELLY, OF CHICOPEE, ASSIGNOR TO THE WARWICK CYCLE MANUFACTURING COMPANY, OF SPRINGFIELD, MASSACHUSETTS.

PNEUMATIC VEHICLE-WHEEL.

SPECIFICATION forming part of Letters Patent No. 504,273, dated August 29, 1893.

Application filed June 12, 1893. Serial No. 477,336. (No model.)

*To all whom it may concern:*

Be it known that I, JARVIS P. KELLY, a citizen of the United States, residing at Chicopee, in the county of Hampden and State of Massachusetts, have invented new and useful Improvements in Rims for Pneumatic-Tired Vehicle-Wheels, of which the following is a specification.

This invention for improvements in rims for pneumatic tired vehicle wheels has especial reference to the capabilities comprised in the rim for the certain, though purposely removable, engagement of the outer tire covering or shoe.

Important objects aimed at are to construct in a simple and inexpensive manner a rim in which the air-tube may be so supported as to present practically the entire bulk thereof outwardly beyond the rim whereby the maximum resiliency is insured, and a rim in which the retention in engagement therewith of the outer shoe or cover is not dependent upon the inflated condition of the air-tube.

To these ends the invention consists in the formation and combination of the parts constituting the rim, all substantially as will hereinafter fully appear and be set forth in the claims.

Reference is to be had to the accompanying drawings, in which—

Figure 1 is a cross section of the rim, air-tube and shoe. Fig. 2 is a side view of the rim with a portion broken away and in section.

The rim consists of an annular main section, A, of thin metal, and the detachably connected thin metal sections, B, B, at each side thereof, each of said sections, B, being composed of arc-formed strips of thin metal which are removably secured to the main section. The main annular section, A, as to its cross sectional form, is in substantially the form of an inwardly opening trough, that is, it comprises the middle portion, $a$, of the support of the tire, and the inwardly turned flanges or lips, $b$, $b$, which are preferably extended parallel with each other. The secondary strips, B, in cross section, have the flat portions, $d$, which lie against the flanges, $a$, $a$, (and are secured thereto by screws, $f, f$) and the laterally and upwardly extended portions, $g$, which just within their edges have a slight inward deflection, as shown at $h$, all whereby an annular groove with a contracted mouth is formed at each edge of the rim within which the beaded or thickened edge, $x$, of the outer covering, C, may set and be retained. These strips are preferably formed in arc sections instead of continuous rings for the purpose of economy and facility of construction and of connection or detachment. If preferred, the edge portions of the main section before being inwardly turned may be slightly outwardly turned, as seen at $i$, and then inwardly turned.

Having thus described my invention, what I claim, and desire to secure by Letters Patent, is—

1. A rim for a pneumatic tired wheel consisting of a main annular section, A, having the intermediate tire supporting portion, $a$, and the inwardly turned lips or flanges, $b$, $b$, and the strips, B, B, comprising the portions, $d$, which lie against the said flanges, and the laterally and outwardly extended portions, $g$, and the screws, which pass through the said parts, $d$, and the flanges, $b$, substantially as described.

2. A rim for a pneumatic tired wheel consisting of a main annular section, A, having the intermediate tire supporting portion, $a$, with portions, $i$, within the edges outwardly turned and then returned inwardly in the flanges, $b$, $b$, and the strips, B, B, comprising the portions, $d$, which lie against the said flanges and the laterally and outwardly extended portions, $g$, and the screws, $f$, which unite the said parts, $d$, and the flanges, $b$, substantially as described.

3. In a wheel, the combination with the main annular section, A, having the intermediate tire supporting portion and the inwardly turned lips or flanges, $b$, and the strips, B, B, comprising the portions, $d$, which lie against said flanges, and the laterally and outwardly extended portions, $g$, and the screws which pass through and unite the said parts, $d$, $d$, and flanges, $b$, of the air-tube and the outer shoe or covering, C, having the beaded edges thereof confined in the grooves formed at the opposite outer edges of the rim, substantially as described.

JARVIS P. KELLY.

Witnesses:
WM. S. BELLOWS,
J. D. GARFIELD.